(12) United States Patent
Gudnason et al.

(10) Patent No.: US 10,879,792 B2
(45) Date of Patent: Dec. 29, 2020

(54) SWITCHED CAPACITOR VOLTAGE CONVERTER FOR A RECHARGEABLE BATTERY IN A HEARING AID

(71) Applicant: Oticon A/S, Smørum (DK)

(72) Inventors: Gunnar Gudnason, Smørum (DK); Rasmus Glarborg Jensen, Smørum (DK); Jess Christensen, Smørum (DK); Kåre Tais Christensen, Smørum (DK)

(73) Assignee: OTICON A/S, Smørum (DK)

( * ) Notice: Subject to any disclaimer, the term of this patent is extended or adjusted under 35 U.S.C. 154(b) by 133 days.

(21) Appl. No.: 16/201,236

(22) Filed: Nov. 27, 2018

(65) Prior Publication Data

US 2019/0165671 A1 May 30, 2019

(30) Foreign Application Priority Data

Nov. 28, 2017 (EP) .................................. 17204102

(51) Int. Cl.
*H02M 1/44* (2007.01)
*H02M 3/07* (2006.01)
(Continued)

(52) U.S. Cl.
CPC .............. *H02M 1/44* (2013.01); *H02M 1/15* (2013.01); *H02M 3/06* (2013.01); *H02M 3/07* (2013.01);
(Continued)

(58) Field of Classification Search
CPC .............. H04R 25/554; H04R 2225/33; H04R 2225/51; H02M 3/06; H02M 3/07
(Continued)

(56) References Cited

U.S. PATENT DOCUMENTS 6,370,046 B1 * 4/2002 Nebrigic ................. H02M 3/07
327/536
2001/0038279 A1 11/2001 Jaworski
(Continued)

FOREIGN PATENT DOCUMENTS

| EP | 2 991 214 A2 | 3/2016 |
| EP | 2 991 214 A3 | 3/2016 |
| JP | 2005-20922 A | 1/2005 |

*Primary Examiner* — Fan S Tsang
*Assistant Examiner* — Julie X Dang
(74) *Attorney, Agent, or Firm* — Birch, Stewart, Kolasch & Birch, LLP

(57) ABSTRACT

The disclosure presents a method of operating a switched capacitor voltage converter and a switched capacitor voltage converter, where the switched capacitor voltage converter comprises a power source, a bucket capacitance, an output capacitance with output capacitance terminals to be connected to a load and switches. The power source provides an input voltage and the output capacitance provides an output voltage over the output capacitance terminals. The output voltage is different from the input voltage, i.e higher or lower or of opposite polarity. The switches are configured to provide at least two phases, a bucket capacitance charging phase and a bucket capacitance discharging phase. In case of a voltage up-converter in the bucket capacitance charging phase the bucket capacitance is connected to the power source for charging the bucket capacitance while the bucket capacitance is not connected to the output capacitance. In a voltage down-converter in the bucket capacitance charging phase the bucket capacitance and the output capacitance are connected in series with the power source. In a voltage up-converter in the bucket capacitance discharging phase the bucket capacitance is connected in series with the power source for charging the output capacitance. In a voltage down-converter in the bucket capacitance discharging phase the bucket capacitance and the output capacitance are con-
(Continued)

nected in parallel with each other while being disconnected from the power source. Further, a detection circuit is provided that is configured to monitor the output voltage over the output capacitance terminals and to cause switching of at least one of said switches so as to interrupt charging of the output capacitance when output voltage exceeds a predefined reference voltage.

16 Claims, 3 Drawing Sheets

(51) Int. Cl.
    *H02M 1/15*        (2006.01)
    *H02M 3/06*        (2006.01)
    *H04R 25/00*     (2006.01)
    *H02M 1/00*        (2006.01)

(52) U.S. Cl.
    CPC ... *H04R 25/554* (2013.01); *H02M 2001/0054* (2013.01); *H02M 2003/072* (2013.01); *H04R 2225/33* (2013.01); *H04R 2225/51* (2013.01)

(58) Field of Classification Search
    USPC .................. 320/124, 126, 137, 140; 323/259
    See application file for complete search history.

(56) References Cited

U.S. PATENT DOCUMENTS

| | | | |
|---|---|---|---|
| 2006/0198170 A1* | 9/2006 | Kasai ................. | H02M 3/1582 363/40 |
| 2011/0241766 A1* | 10/2011 | Zhang .................... | H02M 3/07 327/536 |
| 2013/0223650 A1* | 8/2013 | Takida .................. | H03F 3/181 381/120 |
| 2014/0043864 A1* | 2/2014 | Kroekenstoel ........ | H02M 3/156 363/17 |
| 2016/0142832 A1* | 5/2016 | Hillbratt .............. | A61N 1/0541 381/317 |
| 2016/0277024 A1* | 9/2016 | Karkhanis ............ | H03K 17/975 |

\* cited by examiner

SWITCHED CAPACITOR VOLTAGE CONVERTER FOR A RECHARGEABLE BATTERY IN A HEARING AID

TECHNICAL FIELD

The disclosure relates to a switched capacitor voltage converter for a rechargeable battery in a hearing aid.

BACKGROUND

Switched capacitor voltage converters implement a technique of switching capacitors on and off in such a way as to periodically charge capacitors in one switch position and deliver the capacitor charge in a different switched position. Switched capacitor voltage converters have several applications. Switched capacitor voltage converter generally can be up-converter, down-converter or inverter.

Switched capacitor voltage converters have an input power source providing an input voltage, one bucket capacitor, an output capacitor and e.g. four switches. The input voltage could for example be a voltage generated from the received induced charging current. The induced charging current could be received by a coil antenna. The switches connect the terminals of the bucket to the input and output nodes in a certain sequence, to implement a voltage conversion. This is the basic principle behind all switched-capacitor voltage converters, although the network of switches and bucket capacitors can be much more complex for fractional conversion ratios.

It is known to use the coil antenna in the hearing aid device as a signal receiver wherein such antenna coil is also called telecoil. Due to the limited space within the hearing aid device there is usually not enough space for additional coil which may be used for wireless charging only. Therefor it is beneficial to use already existing antenna coil for both charging and signal receiving such as audio signal and data signal.

In a simple embodiment, switched capacitor voltage converter typically comprise at least one bucket capacitor and one output capacitor as well as switches that are operated periodically in an alternating manner so as to provide a first phase wherein the bucket capacitor is charged by a power source and a second phase wherein the bucket capacitor discharges into the output capacitor and a load connected to the output capacitor, respectively. In order to achieve different output voltages, a plurality of bucket capacitors and switches can be arranged in a cascade like manner. The output voltage that can be achieved is however limited to certain multiples or fractions of the input voltage, i.e. A voltage converter of this type has "natural" voltage ratio given by an integer fraction, for example ½, 2, ¾, 4/3, etc. In other words, a switched capacitor voltage converter comprising a limited number of capacitors and switches cannot necessarily provide a certain desired output voltage. Rather, the output voltage provided by a switched capacitor voltage converter can be a bit off a desired voltage and additionally is typically rippled.

Known topologies of switched capacitor voltage converters are not suitable for being implemented into a PCB layout included by a housing of a hearing aid. For example, in a cellphone it is known to use a switched capacitor voltage converter which includes a topology with multiple ground planes. This type of topology is too bulky to fit into a hearing aid. It is therefore important to minimize the size of the topology of the converter by for example reducing the number of ground planes.

Furthermore, because of the size constraints of a hearing aid and that the hearing aid includes multiple electrical components, such as an antenna coil, which is highly sensitive to electromagnetic interference, then it is not ideal to have a switched capacitor voltage converter with multiple ground planes. The disadvantage of having multiple ground planes is that electromagnetic interference between the multiple ground planes and for example the antenna coil would highly occur because of the size constraints. It is known to utilize existing components of a hearing aid for a ground plane, e.g. a battery of a hearing aid. It is therefore important to minimize the size of the topology of the converter by for example reducing the number of ground planes for reducing the likelihood of electromagnetic interference between a ground plane and electrical components which is highly sensitive to electromagnetic interference, such as an antenna coil.

SUMMARY

It is an object of the invention to provide a switched capacitor voltage converter that can provide an output voltage that can provide a desired voltage conversion rate.

It is a further object of the invention to provide a topology of a switched capacitor voltage converter which has a size constraint suitable for being implemented into a hearing aid.

It is an additional object of the invention to provide a topology of a switched capacitor voltage converter which provide minimized electromagnetic interference to for example an antenna coil of a hearing aid.

According to the invention, a switched capacitor voltage converter is provided, that comprises a power source, a bucket capacitance, an output capacitance with output capacitance terminals to be connected to a load and switches. The power source provides an input voltage and the output capacitance provides an output voltage over the output capacitance terminals. The output voltage is different from the input voltage, i.e higher or lower or of opposite polarity. The switches are configured to provide at least two phases, a bucket capacitance charging phase and a bucket capacitance discharging phase. In case of a voltage up-converter in the bucket capacitance charging phase the bucket capacitance is connected to the power source for charging the bucket capacitance while the bucket capacitance is not connected to the output capacitance. In a voltage down-converter in the bucket capacitance charging phase the bucket capacitance and the output capacitance are connected in series with the power source. In a voltage up-converter in the bucket capacitance discharging phase the bucket capacitance is connected in series with the power source for charging the output capacitance. In a voltage down-converter in the bucket capacitance discharging phase the bucket capacitance and the output capacitance are connected in parallel with each other while being disconnected from the power source.

Further, a detection circuit is provided that is configured to monitor the output voltage over the output capacitance terminals and to cause switching of at least one of said switches so as to interrupt charging of the output capacitance when output voltage exceeds a predefined reference voltage.

The invention is based on the recognition that there are certain conditions where one want to limit the output voltage of the voltage converter. For example, when the voltage converter is running in ×2 ratio (acting as a voltage doubler) and the input voltage is at the upper end of the allowed range, e.g. 1.40V, the output voltage is close to 3.2V. If this is higher than the maximum rated voltage of the circuits connected to the output, one needs to limit the voltage in some way. One possible solution would be to implement a well-known cycle skipping scheme, where the converter is disabled for an entire conversion cycle when the output voltage exceeds a given threshold. This simple cycle skipping works to some extent. The main problem is that the ripple voltage at the output can be high, and the voltage can over-shoot the limit by a large voltage at the first non-skipped cycle. This effect is exacerbated when the bucket capacitor is large compared to the output capacitor.

It is an advantage of the switched capacitor voltage converter according to the invention that too high a voltage overshoot can be avoided without applying e.g. a linear step-down regulator.

In case of a voltage up-converter the predefined threshold voltage is preferably adjustable to a desired voltage that is higher than the and lower than the sum of the input voltage and the bucket voltage.

The bucket capacitance preferably comprises at least one bucket capacitor. Likewise, the output capacitance preferably comprises at least one output capacitor.

A hearing aid or a hearing device may include a common ground plane, wherein the common ground plane may be a certain layer of a printed circuit board or any other passive components included by the hearing aid or the hearing device.

The bucket capacitance and the output capacitance are at least connected directly to the common ground plane.

At least one of electrical components of the hearing device including a power source, a bucket capacitance, an output capacitance, and switches, may be connected to the common ground plane.

The advantage of having a common ground plane is the reduced size of the topology of the switched capacitor voltage converter and the minimized electromagnetic interference between the common ground plane and an antenna coil of the hearing device because of the possibility of placing the common ground plane furthest from an electromagnetic sensitive component, such as the antenna coil.

A hearing device may for example be a hearing aid.

The detection circuit preferably consists of or comprises a comparator that has two comparator input terminals. A first comparator input terminal is connected to the reference voltage. A second comparator input terminal is connected to one of the output capacitance terminals. The comparator further has a comparator output that is operatively connected to at least one of the switches for causing switching of the switch or switches in case the output voltage fed to the second comparator input terminal exceeds the reference voltage being fed to the first comparator input terminal.

The detection circuit preferably is configured to cause switching of the at least one switch synchronous to a system clock signal.

Preferably, the switched capacitor voltage converter further comprises an AND gate that is arranged between the comparator output and at least one of the switches to be controlled by comparator. The AND gate has two AND gate input terminals and an AND gate output terminal. One of the AND gate input terminals is operatively connected to the comparator output. The other AND gate input terminal is configured to receive a system clock signal. The AND gate output terminal is operatively connected to the at least one switch to be controlled by comparator.

Preferably, the other switches that are not controlled by the detection circuit or the comparator, respectively, are only activating when needed, i.e. when the bucket capacitor or the bucket capacitors need recharging. For example, when the input voltage is high, and the load is light, the bucket capacitor is only discharged partially every 10th cycle. If it is known that the bucket capacitor has already been charged, all switches can stay inactive until the next discharge, saving switch drive current. Thus, it is possible to save power in the switched capacitor voltage converter by charging bucket capacitor only when a bucket capacitor voltage drops below a threshold value.

In a preferred embodiment, the switched capacitor voltage converter is configured to provide a voltage conversation ratio between the input voltage and the output voltage, said conversion ratio being ⅔ or 2 or both. In the latter case, the switched capacitor voltage converter can be reconfigured (switched) to allow for different conversion ratios.

According to a preferred aspect, the switched capacitor voltage converter is part of a power management circuit.

According to another preferred aspect, the switched capacitor voltage converter is implemented in a hearing device, i.e. a hearing aid. Preferably, the hearing device is configured to be worn at a user's ear or in a user's ear canal.

Further, a hearing device is preferred that comprises power source having an antenna coil that is configured to provide a current when exposed to an alternating magnetic field provided by a charging device.

A further aspect of the invention is a system comprising a hearing device and a charging device comprising an induction coil that is configured to generate an alternating magnetic field that induces a current in the hearing device's antenna coil.

The object of the invention is further achieved by a method that comprises the steps of:
providing a switched capacitor voltage converter comprising at least one bucket capacitor, at least one output capacitor and at least one switch for connecting or disconnecting, respectively, the bucket capacitor to the output capacitor,
providing a reference voltage
monitoring whether an output voltage over the output capacitor exceeds the reference voltage, and
disconnecting the output capacitor from the bucket capacitor if the output voltage exceeds the reference voltage.

Preferably, the step of monitoring is performed by means of a comparator that permanently compares the output voltage to the reference voltage.

Preferably, the step of disconnecting comprises opening the switch for connecting or disconnecting the bucket capacitor to the output capacitor if a comparator output signal indicates that the output voltage over the output capacitor exceeds the reference voltage.

Preferably the method further comprises providing a switched capacitor voltage converter comprising a bucket capacitance, an output capacitance having output capacitance terminals to be connected to a load and switches, said switches being arranged and configure to alternating switching between a first, bucket capacitance charging phase and a second, bucket capacitance discharging phase.

In case of a voltage up-converter the switches are actuated in an alternating manner so as to provide that
in a respective bucket capacitance charging phase the bucket capacitance is connected to a power source or charging the bucket capacitance while the bucket capacitance is not connected to the output capacitance and in a respective bucket capacitance discharging phase the bucket capacitance is at least initially connected in series with the power source for charging the output capacitance.

In case of a voltage down-converter the switches are actuated in an alternating manner so as to provide that
in a respective bucket capacitance charging phase the bucket capacitance and the output capacitance are connected in series with the power source and
in a respective bucket capacitance discharging phase the bucket capacitance and the output capacitance are at least initially connected in parallel with each other while being disconnected from the power source.

The method may further comprise providing a system clock signal and actuating the switches in a strictly alternating manner depending on the system clock signal.

In an alternative implementation of the method the switches are not actuated in a strictly alternating manner according the clock signal. Rather the switches for connecting the bucket capacitance to a power source are not actuated after being switched into the second, bucket capacitance discharging phase as long as the bucket capacitance does not need to be recharged. In other words: in the alternative implementation of the method, bucket capacitance charging phases and switch actuations related thereto are skip as long as the bucket capacitance does not need a recharge.

The alternative implementation of the method may still use a system clock signal that controls switching of the switches if need, i.e. only in every nth clock cycle of the clock signal.

The step of monitoring is performed by means of a comparator that permanently compares the output voltage to the reference voltage.

The step of disconnecting comprises opening the switch for connecting or disconnecting the bucket capacitor to the output capacitor if a comparator output signal indicates that the output voltage over the output capacitor exceeds the reference voltage.

The method further comprising;
providing a switched capacitor voltage converter comprising a bucket capacitance, an output capacitance having output capacitance terminals to be connected to a load and switches, said switches being arranged and configure to alternating switching between a first, bucket capacitance charging phase and a second, bucket capacitance discharging phase,
actuating the switches in an alternating manner so as to provide that;
in a respective bucket capacitance charging phase;
in case of a voltage up-converter the bucket capacitance is connected to a power source or charging the bucket capacitance while the bucket capacitance is not connected to the output capacitance, or
in case of a voltage down-converter the bucket capacitance and the output capacitance are connected in series with the power source,
in a respective bucket capacitance discharging phase;
in case of a voltage up-converter the bucket capacitance is at least initially connected in series with the power source for charging the output capacitance, or
in case of a voltage down-converter the bucket capacitance and the output capacitance are at least initially connected in parallel with each other while being disconnected from the power source.

The method further comprising providing a system clock signal, and actuating the switches in a strictly alternating manner controlled by the system clock signal.

The switches for connecting the bucket capacitance to a power source are not actuated when being switched into the second, bucket capacitance discharging phase as long as the bucket capacitance does not need to be recharged.

BRIEF DESCRIPTION OF DRAWINGS

The objects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each object may each be combined with any or all features of the other objects. These and other objects, features and/or technical effect will be apparent from and elucidated with reference to the illustrations described hereinafter in which:

FIG. 2b: diagrams illustrating the operation of the switched capacitor voltage up-converter of FIG. 2a.

DETAILED DESCRIPTION

Figure 1:
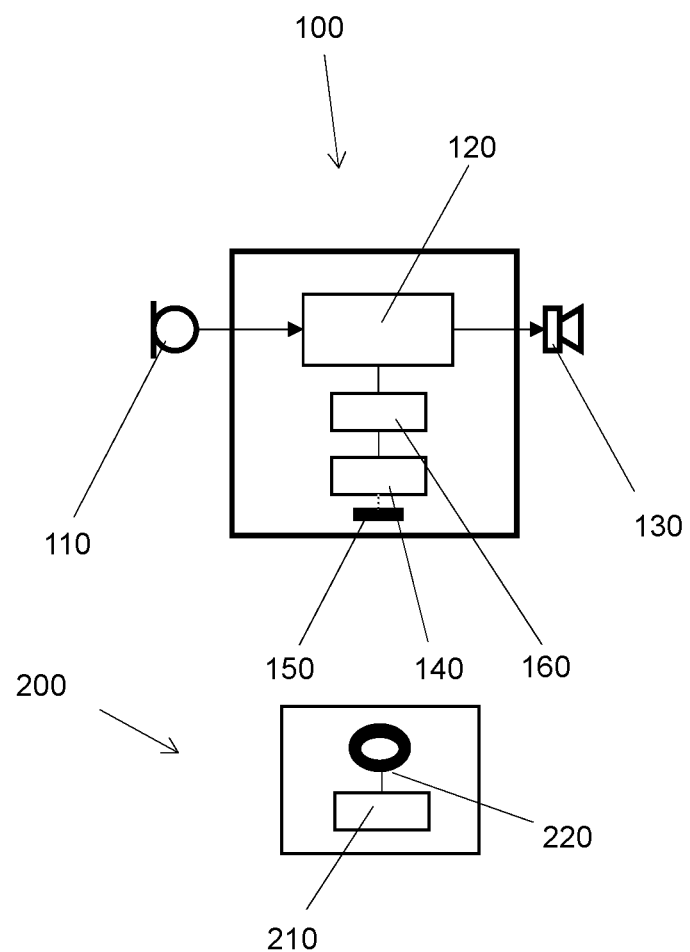
FIG. 1: a schematic diagram of a hearing aid comprising a switched capacitor voltage converter.

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details. Several object of the hearing device system and methods are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

A hearing device may include a hearing aid that is adapted to improve or augment the hearing capability of a user by receiving an acoustic signal from a user's surroundings, generating a corresponding audio signal, possibly modifying the audio signal and providing the possibly modified audio signal as an audible signal to at least one of the user's ears. The "hearing device" may further refer to a device such as an earphone or a headset adapted to receive an audio signal electronically, possibly modifying the audio signal and providing the possibly modified audio signals as an audible signal to at least one of the user's ears. Such audible signals may be provided in the form of an acoustic signal radiated into the user's outer ear, or an acoustic signal transferred as mechanical vibrations to the user's inner ears through bone structure of the user's head and/or through parts of middle ear of the user or electric signals transferred directly or indirectly to cochlear nerve and/or to auditory cortex of the user.

The hearing device is adapted to be worn in any known way. This may include i) arranging a unit of the hearing device behind the ear with a tube leading air-borne acoustic signals or with a receiver/loudspeaker arranged close to or in the ear canal such as in a Behind-the-Ear type hearing aid or a Receiver-in-the Ear type hearing aid, and/or ii) arranging the hearing device entirely or partly in the pinna and/or in the ear canal of the user such as in a In-the-Ear type hearing aid or In-the-Canal/Completely-in-Canal type hearing aid, or iii) arranging a unit of the hearing device attached to a fixture implanted into the skull bone such as in Bone Anchored Hearing Aid or Cochlear Implant, or iv) arranging a unit of the hearing device as an entirely or partly implanted unit such as in Bone Anchored Hearing Aid or Cochlear Implant.

A hearing device may be part of a "hearing system", which refers to a system comprising one or two hearing devices, disclosed in present description, and a "binaural hearing system" refers to a system comprising two hearing devices where the devices are adapted to cooperatively provide audible signals to both of the user's ears. The hearing system or binaural hearing system may further include auxiliary device(s) that communicates with at least one hearing device, the auxiliary device affecting the operation of the hearing devices and/or benefiting from the functioning of the hearing devices. A wired or wireless communication link between the at least one hearing device and the auxiliary device is established that allows for exchanging information (e.g. control and status signals, possibly audio signals) between the at least one hearing device and the auxiliary device. Such auxiliary devices may include at least one of remote controls, remote microphones, audio gateway devices, mobile phones, public-address systems, car audio systems or music players or a combination thereof. The audio gateway is adapted to receive a multitude of audio signals such as from an entertainment device like a TV or a music player, a telephone apparatus like a mobile telephone or a computer, a PC. The audio gateway is further adapted to select and/or combine an appropriate one of the received audio signals (or combination of signals) for transmission to the at least one hearing device. The remote control is adapted to control functionality and operation of the at least one hearing devices. The function of the remote control may be implemented in a SmartPhone or other electronic device, the SmartPhone/electronic device possibly running an application that controls functionality of the at least one hearing device.

In general, a hearing device includes i) an input unit such as a microphone for receiving an acoustic signal from a user's surroundings and providing a corresponding input audio signal, and/or ii) a receiving unit for electronically receiving an input audio signal. The hearing device further includes a signal processing unit for processing the input audio signal and an output unit for providing an audible signal to the user in dependence on the processed audio signal.

The input unit may include multiple input microphones, e.g. for providing direction-dependent audio signal processing. Such directional microphone system is adapted to enhance a target acoustic source among a multitude of acoustic sources in the user's environment. In one object, the directional system is adapted to detect (such as adaptively detect) from which direction a particular part of the microphone signal originates. This may be achieved by using conventionally known methods. The signal processing unit may include amplifier that is adapted to apply a frequency dependent gain to the input audio signal. The signal processing unit may further be adapted to provide other relevant functionality such as compression, noise reduction, etc. The output unit may include an output transducer such as a loudspeaker/receiver for providing an air-borne acoustic signal transcutaneously or percutaneously to the skull bone or a vibrator for providing a structure-borne or liquid-borne acoustic signal. In some hearing devices, the output unit may include one or more output electrodes for providing the electric signals such as in a Cochlear Implant.

It should be appreciated that reference throughout this specification to "one embodiment" or "an embodiment" or "an object" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various objects described herein. Various modifications to these objects will be readily apparent to those skilled in the art, and the generic principles defined herein may be applied to other objects.

The claims are not intended to be limited to the objects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more.

Accordingly, the scope should be judged in terms of the claims that follows.

FIG. 1 is a simplified block diagram of a hearing aid 100 comprising an input transducer 110, a signal processor 120 and an output transducer 130. The input transducer converts incoming sound into an electric audio input signal. The signal processor processes the electric audio input signal according to the needs of a user and produces an electric audio output signal. The output transducer converts the electric audio output signal into a signal that can be perceived by the user as sound.

Since the components of hearing 100 need electric current to be operative, a power source 140 is provided. The power source 140 comprises a rechargeable battery (not shown) and a coil antenna 150 to wirelessly recharge the battery by an induced current via a coil antenna 150.

FIG. 1 also illustrates a charger 200 for charging hearing device 100. The charger 200 comprises a charger power source connected to a charger antenna 220 for transmitting an induced current to the coil antenna 150 of the hearing device 100. The charger antenna 220 is preferably a toroid antenna.

To adjust the electric power delivered by power source 140 to a voltage level as required for the electric components of hearing 100, a voltage converter 160 is provided.

FIG. 2 is a simplified circuit diagram of a switched capacitor voltage up-converter 10 that is configured as a two-phase voltage doubler. This simplified exemplary embodiment was chosen to show how the partial discharge principle can be applied to it to limit the output voltage.

Figure 2B:
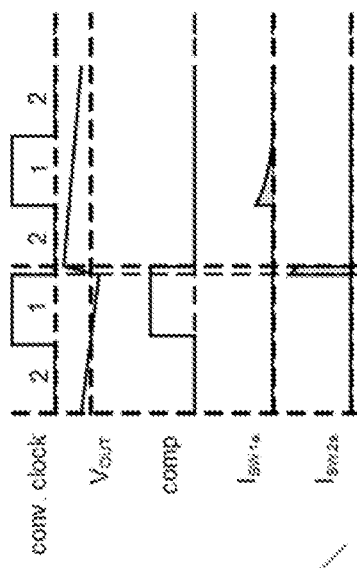
Figure 2A:
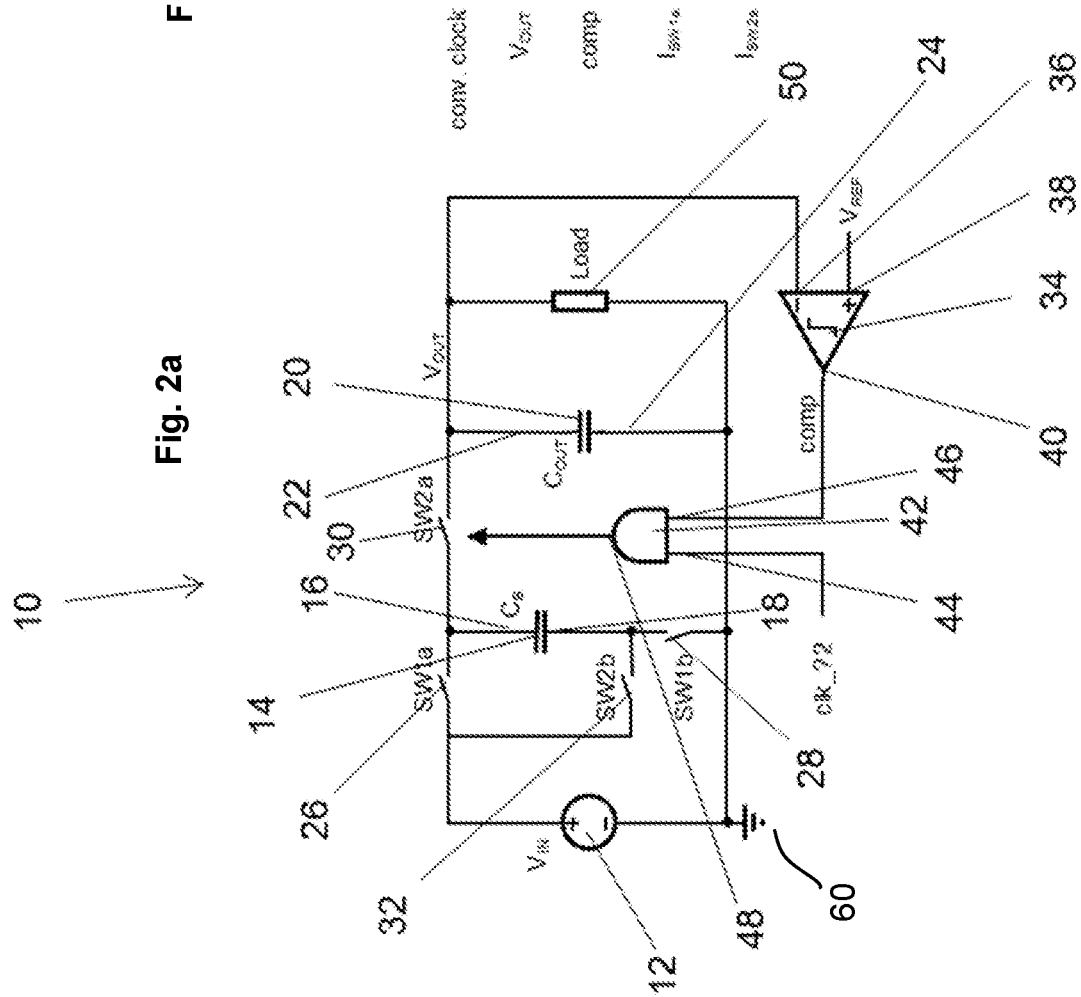
FIG. 2a: a schematic circuit diagram of a switched capacitor voltage up-converter according to the invention.

The switched capacitor voltage up-converter 10, in FIG. 2a, comprises an input power source 12 providing an input voltage Vin. The input voltage Vin could for example be a voltage generated from the received induced charging current. The induced charging current could be received by a coil antenna.

The switched capacitor voltage up-converter 10 further comprises a bucket capacitance provided by at least one bucket capacitor 14 having bucket capacitance output terminals 16 and 18.

The switched capacitor voltage up-converter 10 further comprises an output capacitance provided by at least one output capacitor 20 having output capacitance output terminals 22 and 24.

The switched capacitor voltage up-converter 10 further comprises at least four switches 26, 28, 30 and 32. All switches 26, 28, 30 and 32 connect terminals of the bucket capacitance to the input and output nodes in a certain sequence, to implement a voltage conversion. This is the basic principle behind all switched-capacitor voltage converters, although the network of switches and bucket capacitors can be much more complex for fractional conversion ratios.

Switches 26, 28, 30 and 32 are operated such that when first switches 26 and 28 are closed, second switches 30 and 32 are opened and vice versa. In particular, in a first phase first switches 26 and 28 are closed and thus connect the bucket capacitance terminals 16 and 18 to the voltage source 12 to thus charge bucket capacitor 14, while second switches 30 and 32 are opened thus disconnecting the output capacitor 20 from power source 12 and bucket capacitor 14.

In a second phase, first switches 26 and 28 are opened, thus disconnecting bucket capacitor 14 from power source 12, while second switches 30 and 32 are closed thus connecting bucket capacitor 14 in series with voltage source 12, both being connected to output capacitor 20 in parallel so that the output capacitor 20 is charged with a voltage that corresponds to the sum of the input voltage Vin provided by power source 12 and the voltage Vbucket over the bucket capacitor 16 previously charged. Typically, when bucket capacitor 14 is fully charged in the first phase the sum of Vin and Vbucket is approximately double Vin.

The two phases are typically applied in an alternating sequence, i.e. controlled by a clock signal, i.e. the first phase is applied when the clock signal is high while the second phase is applied when the clock signal is low and so forth.

The switched capacitor voltage up-converter 10 further comprises a fast detection circuit that consists of or comprises a comparator 34. Comparator 34 has two comparator input terminals 36 and 38 and a comparator output terminal 40. A first comparator input terminal 36 is connected to a reference voltage source providing a reference voltage Vref A second comparator input terminal 38 is connected to the output capacitance terminal 22. The comparator output terminal 40 is operatively connected to switch 30 for causing switching of switch 30 between an open switch state and a closed switch state. Comparator 34 is configured to open switch 30 in case the output voltage at output capacitance terminal 22 exceeds the reference voltage Vref thus inhibiting a further increase of the output voltage Vout. To synchronize switching of switch 30 with a system clock signal an AND-gate 42 is arranged between the comparator output terminal 40 and switch 30. The AND-gate 42 has two input terminals 44 and 46, a first AND gate input terminal 44 being connected to a system clock signal and the second AND gate input terminal is connected to the comparator output terminal 40. The AND gate further has an AND-gate output terminal 48 that is operatively connected to switch 30 so that switch 30 is opened and closed depending on the output signal provided by AND gate output terminal 48. Accordingly, switch 30 is only under control of comparator 34 in the second phase, where the bucket capacitor 14 discharges into output capacitor 20 as long as the output voltage Vout does not exceed the reference voltage Vref.

Furthermore, it is shown in FIG. 2a that the power source 12, the bucket capacitance 14, the output capacitance 20 and the switches are connected directly to a common ground plane 60. In a further example, not illustrated in FIG. 2a, at least the bucket capacitance 14 and the output capacitance 20 are connected to the common ground plane 60.

This is illustrated in FIG. 2b. The first line in FIG. 2b illustrates the clock signal that periodically alternates between a low-state and a high-state, corresponding to said second phase and said first phase, respectively. The second line in FIG. 2b illustrates the output voltage Vout over output capacitor 20. The third line in FIG. 2b illustrates the comparator output signal at comparator output terminal 40 that controls switching of switch 30 via AND gate 42 that is clocked by a clock signal.

If comparator 34 indicates that the output voltage Vout at output capacitance terminal 22 is below the reference voltage Vref at the beginning of clock phase 2, switch 30 is closed, enabling charge transfer to the output capacitor 20. If the output voltage Vout over the output capacitor 20 rises above the reference voltage Vref during that half-cycle, the switch 30 is opened and stays opened for the remainder of the cycle. This is controlled by a state machine not shown in FIG. 2b.

Figure 3:
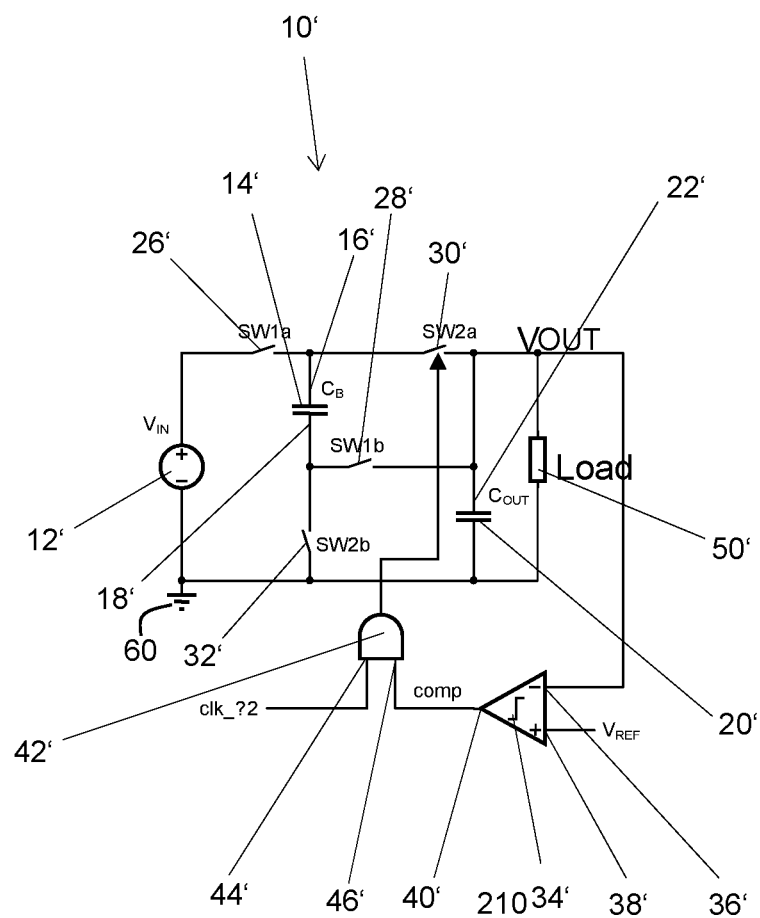
FIG. 3: a schematic circuit diagram of a switched capacitor voltage up-converter according to the invention.

FIG. 3 illustrates an example of a voltage down-conversion switched capacitor voltage converter that applies the partial discharge principle. The circuit in FIG. 3 illustrates a possible implementation of output regulation by partial discharge. The operation is different to the doubler case as shown in FIG. 2 in one key respect: charge can be delivered to the output node in both clock phases, and charge transfer is only regulated in phase 2. As in case of the voltage up-converter shown in FIG. 2, the voltage down-converter of FIG. 3 comprises a power source 12', a bucket capacitor 14' and an output capacitor 20'. Switches 26' and 28' are opened and closed and switches 30' and 32' are closed and opened in an alternating manner such that switches 30' and 32' only can be closed when switches 26' and 28' are opened to thus provide a first, charging phase and a second, discharging phase. Other than in case of a voltage up-converter illustrated in FIG. 2, in the voltage down-converter in FIG. 3, bucket capacitor 16' and output capacitor 20' are connected in series to each other with power source 12' in the first, charging phase, while bucket capacitor 16' and output capacitor 20' are connected in parallel to each other and to load 50' in a second, discharging phase.

Switching of switch 30' is controlled by both, the system clock signal fed to input 44' of AND gate 42' and the output signal of comparator 34' fed to input 46' of AND gate 42'. When switch 30' is down, i.e. a current can go through switch 30', the output capacitor 20' is being charged, and when 30' switch is up then the output capacitor 20' is being discharged.

In both cases, a voltage up-converter as illustrated in figure and a voltage down-converter as illustrated in FIG. 3, the switches 26, 26', 28, 28', 32 and 32' not controlled by the detection circuit or the comparator 34 or 34', respectively, can be either switched in a strict alternating manner by the system clock signal or they can be switched more sophistically in that other switches 26, 26', 28, 28', 32 and 32' that are not controlled by the detection circuit or the comparator 34 or 34', respectively, are only activating when needed, i.e. when the bucket capacitor 16, 16' or the bucket capacitors need recharging. For example, when the input voltage is high, and the load is light, the bucket capacitor 16 or 16' is only discharged partially every 10th cycle. If it is known that the bucket capacitor has already been charged and the bucket capacitor voltage is higher than the threshold value, all switches can stay inactive until the next discharge, saving switch drive current. Said threshold value may be a fixed value (for example 90% of a maximal bucket capacitor voltage) or may be a programmable value and it may change with respect to working condition, predicted power consumption etc.

According to this preferred embodiment, switches 26, 26', 28, 28', 32 and 32' may stay switched—thus not being actuated—as long as bucket capacitor 16, 16' does not need to be recharged. Switch 30 or 30' that controls charge delivery from the bucket capacitor 16 or 16' to the output capacitor 20 or 20' is only closed when the output capacitor needs to be recharged. That may occur only every nth cycle while switches 26, 26', 28, 28', 32 and 32' may not be actuated a manifold of n cycles.

The invention claimed is:

1. A switched capacitor voltage converter comprising:
   a power source;
   a bucket capacitance Cbuckett;
   an output capacitance Cout having output capacitance terminals to be connected to a load;
   switches; and
   a detection circuit configured to monitor an output voltage Vout over the output capacitance terminals and to cause switching of at least one of said switches so as to interrupt charging of the output capacitance when the output voltage exceeds a predefined reference voltage,
   wherein said power source is configured to provide an input voltage Vin, said output capacitance is configured to provide the output voltage Vout over said output capacitance terminals which is different from said input voltage Vin, and
   wherein said switches configured to provide at least two phases;
      a bucket capacitance charging phase wherein in case of a voltage up-converter the bucket capacitance is connected to the power source for charging the bucket capacitance while the bucket capacitance is not connected to the output capacitance or in case of a voltage down-converter the bucket capacitance and the output capacitance are connected in series with each other to the power source;
      a bucket capacitance discharging phase, wherein in case of a voltage up-converter the bucket capacitance is connected in series with the power source for charging the output capacitance, or in case of a voltage down-converter the bucket capacitance and the output capacitance are connected in parallel to each other while being disconnected from the power source, and
   wherein said detection circuit comprises a comparator having two comparator input terminals, a first comparator input terminal being connected to a reference voltage Vref, a second comparator input terminal being connected to one of the output capacitance terminals, said comparator further having a comparator output that is operatively connected to said at least one switch for causing switching of said at least one switch in case the output voltage Vout fed to said second comparator input terminal exceeds said threshold voltage Vref being fed to said first comparator input terminal.

2. Switched capacitor voltage converter according to claim 1, wherein in case of a voltage up-converter the predefined threshold voltage is adjustable to a desired voltage that is higher than the input voltage and lower than the sum of the input voltage and the bucket voltage.

3. Switched capacitor voltage converter according to claim 1, wherein said bucket capacitance comprises at least one bucket capacitor.

4. Switched capacitor voltage converter according to claim 1, wherein said output capacitance comprises at least one output capacitor.

5. Switched capacitor voltage converter according to claim 1, wherein said detection circuit is configured to cause switching of said at least one of said switches synchronous to a system clock signal.

6. Switched capacitor voltage converter according to claim 5, further comprising an AND gate that is arranged between the comparator output and at least one of said switches to be controlled by comparator, said AND gate having two AND gate input terminals and an AND gate output terminal, one of said AND gate input terminals being operatively connected to the comparator output, the other AND gate input terminal being configured to receive a system clock signal, the AND gate output terminal being operatively connected to said at least one switch to be controlled by comparator.

7. Switched capacitor voltage converter according to claim 1, wherein the other switches that are not controlled by the detection circuit or the comparator, respectively, are only activated when a bucket capacitor voltage drops below a threshold value.

8. Switched capacitor voltage converter according to claim 1, wherein the switched capacitor voltage converter is configured to provide a voltage conversation ratio between the input voltage and the output voltage, said conversion ratio being ⅔ or 2 or both.

9. Power management circuit comprising a switched capacitor voltage converter according to claim 1.

10. Hearing device comprising a switched capacitor voltage converter according to claim 1.

11. Hearing device according to claim 10 wherein the hearing device is configured to be worn at a user's ear or in a user's ear canal.

12. Hearing device according to claim 10, wherein the power source comprises an antenna coil that is configured to provide a current when exposed to an alternating magnetic field provided by a charging device.

13. System comprising a hearing device according to claim 12 and a charging device comprising an induction coil that is configured to generate an alternating magnetic field that induces a current in the hearing device's antenna coil.

14. A method of operating a switched capacitor voltage converter comprising the steps of:
   providing a switched capacitor voltage converter comprising at least one bucket capacitor, at least one output capacitor and at least one switch for connecting or disconnecting, respectively, the bucket capacitor to the output capacitor,
   providing a reference voltage,
   monitoring whether an output voltage over the output capacitor exceeds the reference voltage, and
   disconnecting the output capacitor from the bucket capacitor if the output voltage exceeds the reference voltage, wherein
   the monitoring is performed using a detection circuit that comprises a comparator having two comparator input terminals, a first comparator input terminal connected to said reference voltage, a second comparator input terminal connected to at least one of the output capacitance terminals, and a comparator output that is operatively connected to said at least one switch for causing switching of said at least one switch in case the output voltage fed to said second comparator input terminal exceeds said threshold voltage fed to said first comparator input terminal.

15. A switched capacitor voltage converter comprising:
a power source;
a bucket capacitance Cbucket;
an output capacitance Cout having output capacitance terminals to be connected to a load;
one or more switches; and
a detection circuit configured to monitor an output voltage Vout over the output capacitance terminals and to cause switching of at least one of said switches so as to interrupt charging of the output capacitance when output voltage exceeds a predefined reference voltage,
wherein said power source is configured to provide an input voltage Vin, said output capacitance is configured to provide an output voltage Vout over said output capacitance terminals which is different from said input voltage Vin, and wherein said switches configured to provide at least two phases:
  a bucket capacitance charging phase wherein in case of a voltage up-converter the bucket capacitance is connected to the power source for charging the bucket capacitance while the bucket capacitance is not connected to the output capacitance or in case of a voltage down-converter the bucket capacitance and the output capacitance are connected in series with each other to the power source, and
  a bucket capacitance discharging phase, wherein in case of a voltage up-converter the bucket capacitance is connected in series with the power source for charging the output capacitance, or in case of a voltage down-converter the bucket capacitance and the output capacitance are connected in parallel to each other while being disconnected from the power source, and
wherein said detection circuit is configured to cause switching of at least one of said switches synchronous to a system clock signal.

16. A switched capacitor voltage converter comprising:
a power source;
a bucket capacitance Cbucket;
an output capacitance Cout having output capacitance terminals to be connected to a load;
one or more switches;
a detection circuit configured to monitor an output voltage Vout over the output capacitance terminals and to cause switching of at least one of said switches so as to interrupt charging of the output capacitance when output voltage exceeds a predefined reference voltage; and
an AND gate arranged between a comparator output and at least one of said one or more switches to be controlled by the comparator, said AND gate having two AND gate input terminals and an AND gate output terminal, one of said AND gate input terminals being operatively connected to the comparator output, the other AND gate input terminal being configured to receive a system clock signal, the AND gate output terminal being operatively connected to said at least one switch to be controlled by the comparator,
wherein said power source is configured to provide an input voltage Vin, said output capacitance is configured to provide an output voltage Vout over said output capacitance terminals which is different from said input voltage Vin, and wherein said switches configured to provide at least two phases:
  a bucket capacitance charging phase wherein in case of a voltage up-converter the bucket capacitance is connected to the power source for charging the bucket capacitance while the bucket capacitance is not connected to the output capacitance or in case of a voltage down-converter the bucket capacitance and the output capacitance are connected in series with each other to the power source, and
  a bucket capacitance discharging phase, wherein in case of a voltage up-converter the bucket capacitance is connected in series with the power source for charging the output capacitance, or in case of a voltage down-converter the bucket capacitance and the output capacitance are connected in parallel to each other while being disconnected from the power source.

* * * * *